July 26, 1938.  G. HEYMER  2,125,162

MANUFACTURE OF LENTICULAR STENCIL FILM

Filed June 9, 1936

Inventor
Gerd Heymer
By Attorney
Philip S. Hopkins

Patented July 26, 1938

2,125,162

UNITED STATES PATENT OFFICE 2,125,162

MANUFACTURE OF LENTICULAR STENCIL FILM

Gerd Heymer, Wolfen Kreis Bitterfeld, Germany, assignor to Agfa Ansco Corporation, Binghamton, N. Y., a corporation of New York Application June 9, 1936, Serial No. 84,326
In Germany April 30, 1932

2 Claims. (Cl. 88—19.5)

My present invention relates to the manufacture of lenticular stencil film. It is a continuation in part of my application Ser. No. 667,925 filed April 25, 1933 which has matured into Patent No. 2,066,727, dated Jan. 5, 1937.

One of its objects is to provide a process for the manufacture of lenticular stencil film. Another object is the lenticular stencil film. Further objects will be seen from the detailed specification following hereafter.

Figure 1:
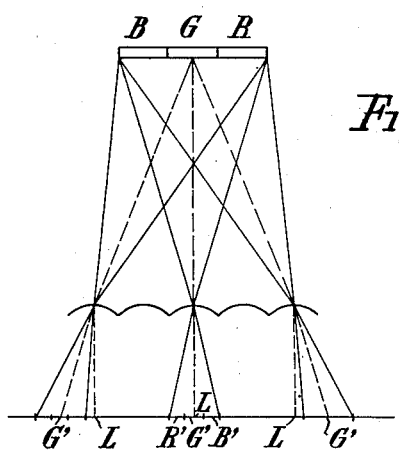
Figure 2:
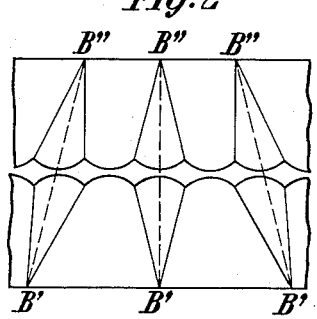
Figure 3:
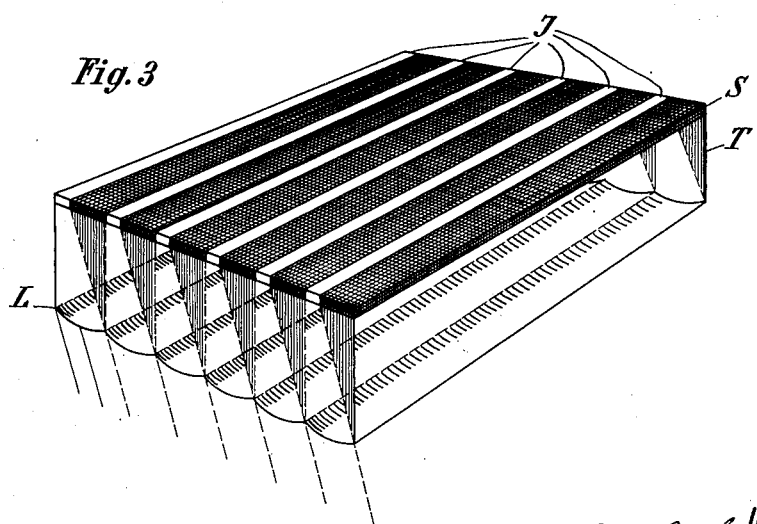

Reference is made to the accompanying drawing in which:

Fig. 1 shows the relations between a lenticular film and the co-ordinated multi-color filter in taking, and Fig. 2 shows the manner in which the partial color picture strips behind the lenticular elements are displaced when printing the lenticular film shown in Fig. 1 in contact on a light sensitive lenticular film with the lenticular elements facing each other, and Fig. 3 shows a lenticular stencil film in accordance with the invention.

In my above mentioned application I have described a process for the production of partial color pictures by printing from a lenticular film without the application of a diaphragm. This is realized by arranging in contact with the lenticular film from which the partial color pictures are to be printed a second lenticular film acting in the manner of a stencil in that it admits only one partial color picture to act on the printing material. Printing with a stencil film is in manner related with the printing of lenticular film in contact, because the original and the stencil film are also arranged with their lenticulated side in contact and the original is illuminated from the rear side.

The principle which leads to the production of a stencil film will more clearly result from the following explanations. In taking a lenticular film the lenticular elements project real images R'G'B' (see Fig. 1) on the emulsion layer of the photographic film. When comparing the position of the various small central pictures G' it will be found that these pictures corresponding with the middle or green filter strip of the multi-color filter lie in the middle of the space of the emulsion layer behind one lenticular element but are displaced towards the margin on the space behind the marginal lenticular elements. By the position of the small pictures on the space behind the lenticular elements the position of the multi-color filter is determined. The lines from the central partial color picture strip to the center of the co-ordinated lenticular element are called filter middle lines or green middle lines as the green filter strip is usually the central filter strip.

If the afore-described film is printed on another lenticular film with its lenticular elements facing those of the printing film as it is shown in Fig. 2, the above described displacements of the partial color strips with relation to the axis of the lenticular elements are reversed, that is to say the partial color strips on the margin of the films which are displaced outwardly on the original are displaced inwardly on the printing film. If, for instance, the red strip of the multi-color filter is photographed on a lenticular film and the original thus taken is printed on a second, light-sensitive lenticular film in contact with the lenticulated sides of the films facing each other it will be found that the print has transparent strips in the silver layer at places corresponding with those of the original, however, these strips are displaced on the print with relation to the axis of the lenticular elements by the same amount inwardly as they are displaced outwardly on the original. If instead of the afore-said original there is placed another original containing in its emulsion layer another picture on the afore-said print and illuminating the film from the layer-side, this original is projected on the print made from the original taken by illumination with the red filter strip. However, as this print is only transparent at those places at which the red filter strip had been copied only those rays can pass unhindered through the film which correspond with the red partial color picture in taking. Therefore, it is possible to separate by means of a stencil film the trace of the rays of a partial color picture of a lenticular film from the remaining partial color pictures and to print this partial color picture on another material. If the trace of the rays is reversed and illumination is made first through the stencil film and then through the lenticular elements of a light sensitive lenticular film only such rays are recorded on the second film as correspond with those passing through the red filter strip in taking so that it is possible to print partial color pictures taken on smooth film on a lenticular film by contact printing.

From this application of a stencil film clearly follows its production attention being necessary that the inclination of the rays from the lenticular elements to the middle of the green filter strip be correct.

As already described for the production of a stencil film there is first made a so-called intermediate film, that is to say a film which under the filter condition of the exposure is taken through a single filter strip as above described through the red filter strip. In exactly the same manner there is produced an intermediate film by illuminating a light sensitive lenticular film through the green filter strip and a further intermediate film by illuminating a lenticular film through the blue filter strip. All these films have the following characteristic: Behind each lenticular element there are positioned transparent strips and opaque strips which latter are formed by developed silver. Instead of the opaque strips there may also be present colored strips. If light is projected through the middle of the transparent strips in direction towards the middle of the co-ordinated lenticular element all these rays cut each other in the middle of the corresponding color strip of the exposure filter.

Obviously it is not necessary to use in the manufacture of the intermediate film the color strip of an exposure filter but it is also possible to use instead an illuminated diaphragm the aperture of which corresponds as to size and position with relation to the film with these conditions of the exposure filter strip replaced by the diaphragm aperture. If the stencil film is intended for use in printing partial color pictures on a lenticular film the dimensions of the corresponding values of the projection filter are determinative. The stencil film is produced from the intermediate film by illuminating the intermediate film placed in contact with a light sensitive lenticular film with the lenticulated sides facing each other by means of a diffused source of light for instance an illuminated ground glass screen.

A stencil film in accordance with the invention is shown in Fig. 3. It consists of the support T, having a system of lenticular embossings L, and the light-sensitive layer S which is blackened except for the transparent areas J. These areas occupy determined positions to the lenticular elements L that in each particular case is characteristic for the direction of the light which emanates from the lenses L, if the "stencil film" is illuminated through its layer side.

What I claim is:

1. A lenticular film comprising an emulsion layer and in this emulsion layer a silver picture composed of alternating transparent and blackened stripes of which one transparent stripe and one blackened stripe are co-ordinate to one lenticular element, the central line of the transparent stripes positioned near the margin of the film being displaced towards the margin of the film with respect to the central line of the transparent areas positioned in the middle of the film.

2. A lenticular film comprising an emulsion layer and in this emulsion layer a silver picture composed of alternating transparent and blackened stripes of which one transparent stripe and one blackened stripe are co-ordinate to one lenticular element, the central line of the transparent stripes positioned near the margin of the film being displaced towards the middle of the film with respect to the central line of the transparent areas positioned in the middle of the film.

GERD HEYMER.